United States Patent [19]
Garver et al.

[11] Patent Number: 6,062,786
[45] Date of Patent: May 16, 2000

[54] ANTI-CROSS TREADING FASTENER LEAD-IN POINT

[76] Inventors: Michael A. Garver, 6147 Winans Dr., Brighton, Mich. 48116; Jerry J. Goodwin, 5998 Runnymeade, Canton, Mich. 48187; Anthony L. Snoddy, 1080 Westview Way, Ann Arbor, Mich. 48103

[21] Appl. No.: 09/191,335
[22] Filed: Nov. 13, 1998
[51] Int. Cl.[7] .............................. F16B 25/00; F16B 35/04
[52] U.S. Cl. ...................... 411/386; 411/387.4; 411/426
[58] Field of Search ............................... 411/386, 387.4, 411/411, 426

[56] References Cited

U.S. PATENT DOCUMENTS

| | | | |
|---|---|---|---|
| 3,094,894 | 6/1963 | Broberg | 411/387.4 |
| 5,073,073 | 12/1991 | Kazino et al. | 411/426 X |
| 5,209,622 | 5/1993 | Kazino et al. | 411/386 |
| 5,730,566 | 3/1998 | Goodwin et al. | 411/386 |
| 5,791,849 | 8/1998 | Goodwin et al. | 411/386 |

*Primary Examiner*—Neill Wilson
*Attorney, Agent, or Firm*—Frohwitter; R. William Beard, Jr.

[57] ABSTRACT

A lead-in point on an end of an externally threaded fastener has a shape in any axial section defined by a curve tangent to the inside of a cylinder formed about the thread axis. The cylinder is of a diameter smaller than the smallest permissible minor (inner) diameter of a mating internal thread, but preferably larger than the minor diameter of the external thread. The length of the lead-in point is preferably from one to three thread pitches. The curved surface of the lead-in point is such that at any practical angle of insertion (where thread engagement is possible), the dimensional characteristics of the lead-in point present only a curved surface (not an edge) for possible contact with the internal threads. This length also insures that the end of the fastener is small enough to feed into internal threads at all angles where such thread contact is effective in producing a threaded joint.

20 Claims, 11 Drawing Sheets

ANTI-CROSS TREADING FASTENER LEAD-IN POINT

CROSS REFERENCE TO RELATED PATENT APPLICATIONS

This patent application is related to commonly owned U.S. Pat. No. 5,730,566, issued Mar. 24, 1998; U.S. Pat. No. 5,791,849, issued Aug. 11, 1998; and U.S. patent application Ser. No. 09/006,078, now U.S. Pat. No. 5,836,731; all being incorporated by reference herein.

BACKGROUND OF THE INVENTION

1. Field of the Invention

The present invention relates to threaded fasteners, and more particularly, to a lead-in point piloting an end of the external portion of the threaded fastener into better axial alignment with the mating internal portion of the fastener so as to reduce the chance of cross-threading and/or jamming of the external and internal thread helixes.

2. Description of the Related Technology

Threaded fastener technology is basic to the construction or fabrication of most articles of manufacture such as machines, automobiles, trains, planes, boats, engines, and the like. Threaded fasteners may be bolts, screws, studs, rods, or other substantially round members having uniform, non-uniform or tapered external helical threads that are screwably engaged into internal helical threads such as nuts, bolts, holes and the like. For proper engagement of the external and internal member portions of the threaded fasteners, the longitudinal axis of the externally threaded member portion must be substantially collinear with the longitudinal axis of the mating internally threaded member portion. If collinearity is not maintained between the externally and internally threaded member portions, then cross-threading occurs.

Cross-threading generally occurs when there is a mis-alignment between the externally threaded member portion, typically a screw or bolt, and the internally threaded member portion, typically a nut or other threaded internal opening. Specifically, cross-threading is the result of the threads of the two member portions attempting to engage at least one half pitch out of alignment. When this situation happens, the two member portions are not substantially collinear with each other and wedging of the threads will occur as the threaded helixes are rotated against each other. If rotation continues, then threads on one or both members will be structurally damaged.

Figure 1:
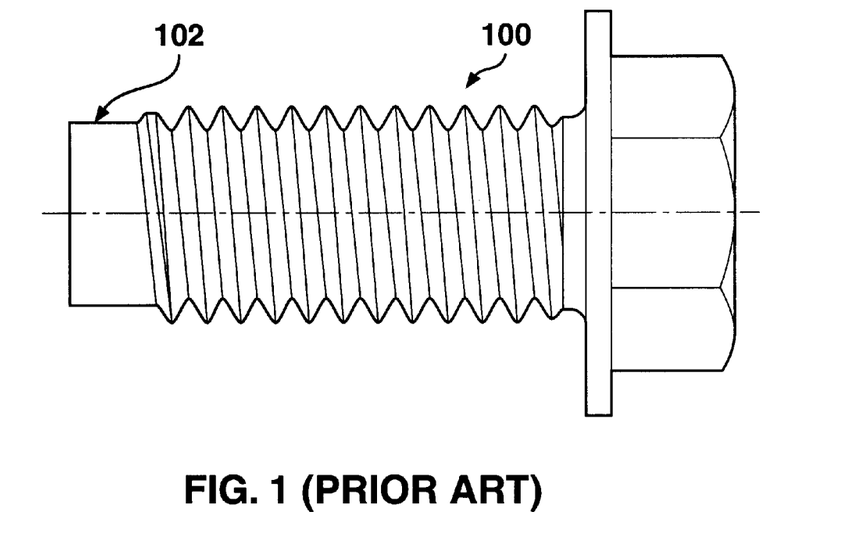
FIG. 1 is a side elevational view of a fastener having an external thread helix and a prior art lead-in point.
Figure 2:
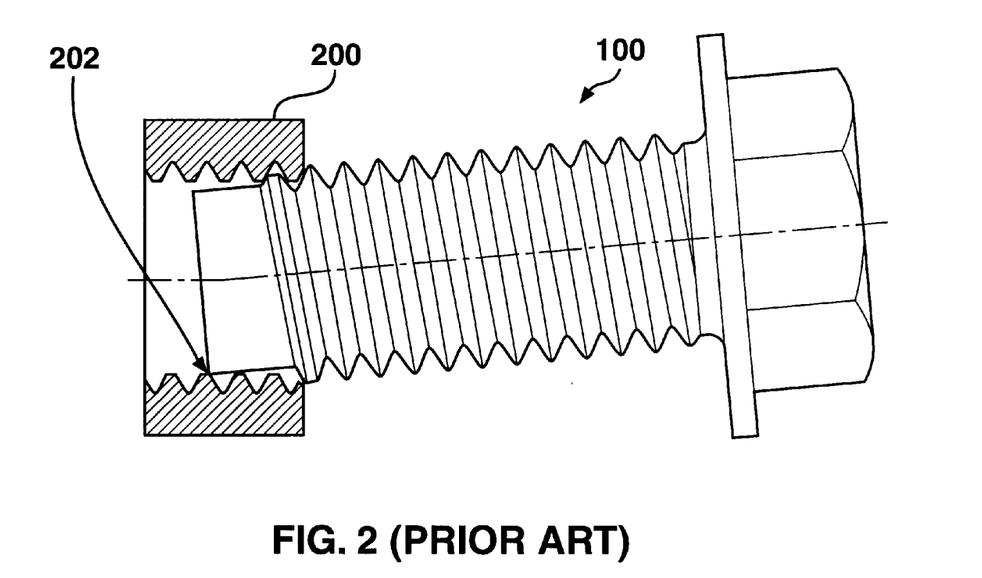
FIG. 2 is a side elevational view of the prior art fastener of FIG. 1 in a position to be jammed into the internal thread helix of a mating fastener.

A lead-in, such as a "pilot" or "dog" point, on an end of the externally threaded member portion, see generally FIG. 1, may be used to restrict the axial mis-alignment between the external and internal member portions of the threaded fastener. The lead-in helps reduce cross-threading and/or jamming of the thread helixes, see generally FIG. 2. The axial mis-alignment is reduced by utilizing the length and/or diameter of the externally threaded member portion lead-in which slidably engages the internal member portion, thus restricting axial mis-alignment variance therebetween. Long lead-ins, i.e., greater than three thread pitches in length, are commonly used, but short lead-ins have been used, i.e., less than three thread diameters, with less than satisfactory results. The short lead-ins have tended to cause assembly difficulties, primarily due to the following two problems:

When the externally threaded member portion having a short lead-in is inserted into the internally threaded member portion in an axially mis-aligned condition, the end of the lead-in may contribute to thread jamming by becoming lodged in an internal thread impression, see generally FIG. 2. This prevents the internal and external thread helixes to feed axially relative to one another, thus preventing the surfaces of the internal and external fastener member portions from sliding into correct axial alignment. When this occurs, continuing to turn the fastener member(s) will result in one or both of the fastener member thread helixes being damaged.

The purpose of the lead-in is to reduce axial misalignment. Therefore, when a shorter lead-in is used, the diameter of the lead-in generally needs to be made larger so as to properly restrict axial misalignment, see FIG. 3. A larger lead-in diameter, however, makes it more difficult to feed the lead-in into the internal thread, and thus the less effective is the desired axial alignment.

What is needed is a short lead-in located at one end of an externally threaded fastener member that will not jam when inserted into an internally threaded fastener member at typical misalignment angles during an assembly process.

SUMMARY OF THE INVENTION

The present invention meets the aforementioned need and also overcomes the above-identified problems as well as other shortcomings and deficiencies of existing fastener technologies by providing a pilot point lead-in, located at one end of an externally threaded fastener member, comprising a variable outer diameter and a length, preferably, of from one to three thread pitches. The variable diameter of the pilot point lead-in, according to the present invention, is at its maximum at the proximate end of the lead-in. The proximate end of the lead-in is proximate to where the first helix thread begins on the externally threaded fastener member. The diameter of the lead-in pilot point becomes smaller toward the distal end of the lead-in. The distal end of the lead-in is the farthest point from where the first helix thread begins (opposite the proximate end).

According to the present invention, the shape of the surface of the lead-in any axial section is defined by a curve tangent to the inside of a cylinder formed about the thread axis. The cylinder is of a diameter smaller than the smallest permissible minor (inner) diameter of the mating internal thread, but larger than the minor diameter of the external thread. This curve is preferably of a radius equal to the diameter of the aforementioned cylinder, and having its locus on the opposite side thereof. It is contemplated and within the scope of the present invention that the curve of the lead-in may be comprised of any convex curve, or series of curves and straight sections, provided that the curve does not exceed the limits of an area defined by the smallest and largest permissible radii described hereinabove. The locus of the radius forming this curve and the tangent point of the curve to the cylinder lie on the opposite sides of the cylinder at the intersection of a plane normal to the axis of the fastener member and the aforementioned cylinder described hereinabove. This plane is preferably located on the lead thread(s) at the base of the leading thread surface (flank or curve), where it intersects the cylinder, in the first location on the thread helix where the overall thread height reaches approximately the height of the pitch diameter in an axial section.

Figure 4A:
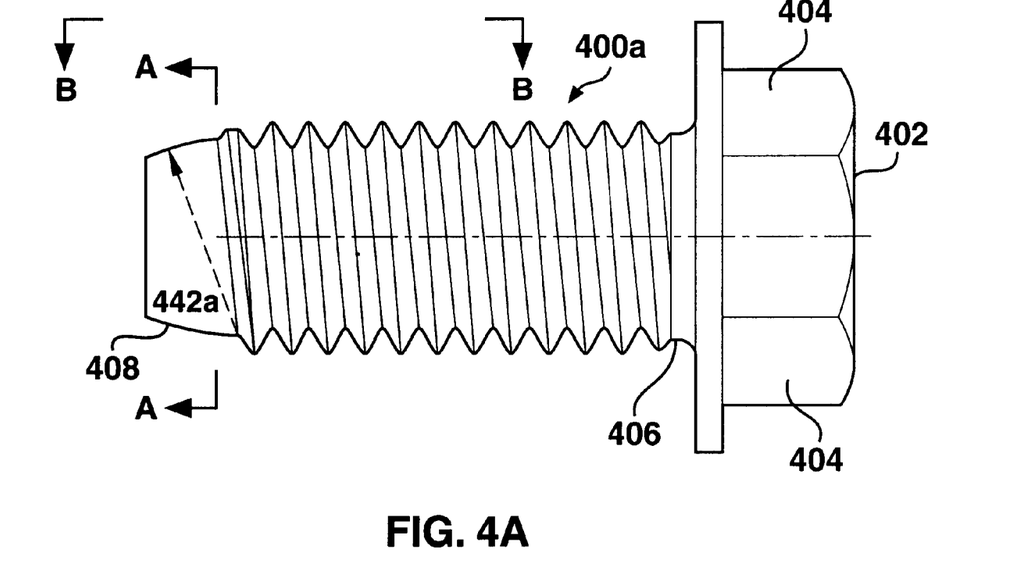
FIGS. 4A and 4B are side elevational views of embodiments of fasteners according to the present invention.
Figure 4B:
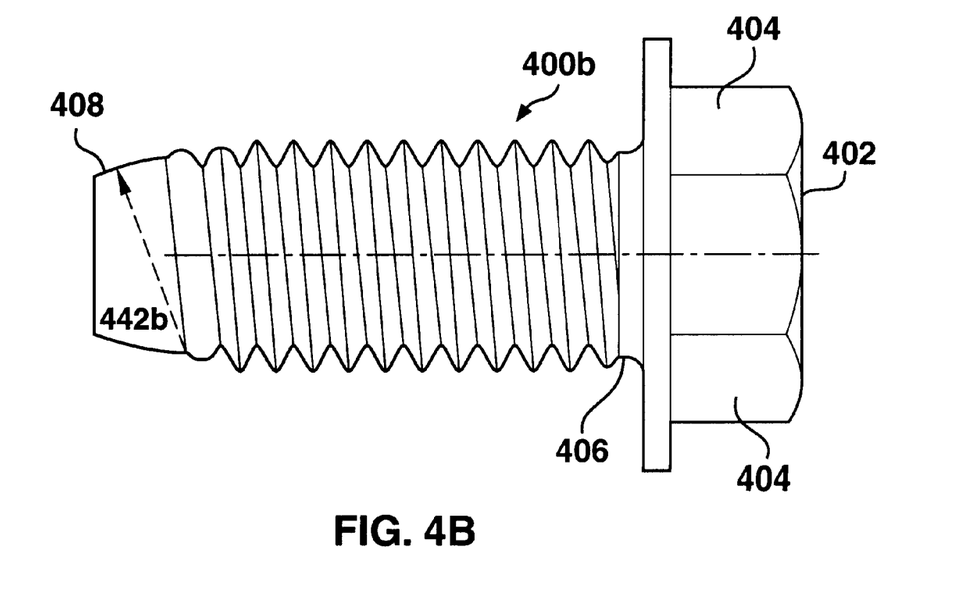

Thus every point on the curve forming the pilot point lead-in may be at a constant distance from a point on the opposite side of the pilot point lead-in, see generally FIGS. 4A and 4B, radius 442. This distance is such that when the first external thread pitch has engaged the first full height thread pitch of the internal thread, the externally threaded member may freely pivot about the intersection of the pilot point and the first thread of the internally threaded member without contacting an adjacent internal thread, see generally FIGS. 6A–6C. The constant distance also insures that the first external thread pitch (be it a full or partial thread or a special thread from a localized height preferably at least 40% of a full thread height) is restricted from climbing over the next internal thread peak, i.e., the lead-in curve restricts the radial movement of the first external thread when engaging the first internal thread.

Another embodiment of the pilot point curve forming the pilot point lead-in, according to the present invention (see generally FIG. 4D), wherein the radius of the pilot point curve is larger than the pilot cylinder radius but smaller than the external thread major diameter. The radius of the pilot point curve is tangent to the pilot cylinder at the intersection of a plane perpendicular with the axis of the cylinder. The locus of the pilot point curve radius may be located on a plane between the thread axis and the thread major diameter.

Still another embodiment of the pilot point curve forming the pilot point lead-in, according to the present invention (see generally FIG. 4E), wherein the radius of the pilot point curve is smaller than the pilot cylinder radius but larger than one half the thread pitch. The radius of the pilot point curve is tangent to or intersects the pilot cylinder, and is tangent to the end of the pilot point.

Yet another embodiment of the pilot point curve forming the pilot point lead-in, according to the present invention (see generally FIG. 4F), wherein the radius of the pilot point curve is smaller than the external thread outer diameter but larger than the pilot radius. The radius of the pilot point curve is not tangent to but intersects the pilot cylinder within two thread pitches of a plane intersecting the proximate end of the pilot point adjacent the start of the first thread. The locus of the radius may be within plus or minus one thread pitch (axially) of the plane at the proximate end of the pilot point (closest to the start of the first thread). Preferably, the locus may be located between the axis of the pilot cylinder and the major diameter of the external thread.

Another embodiment of the pilot point curve forming the pilot point lead-in, according to the present invention (see generally FIG. 4G), wherein the radius of the pilot point curve is smaller than the pilot radius but larger than one half the thread pitch. The radius of the pilot point curve intersects, or alternatively, is tangent to the pilot cylinder. The pilot point curve radius may be tangent to a line at the end of the point and at an angle of from about 14 to 60 degrees of the pilot point axis.

The length of the pilot point lead-in is preferably from one to three thread pitches. The curved surface of the lead-in is such that at any practical angle of insertion (where thread engagement is possible), the dimensional characteristics of the lead-in point present only a curved surface (not an edge) for possible contact with the internal threads. This length also insures that the end of the fastener is small enough to feed into internal threads at all angles where such thread contact is effective in producing a threaded joint.

Figure 7A:
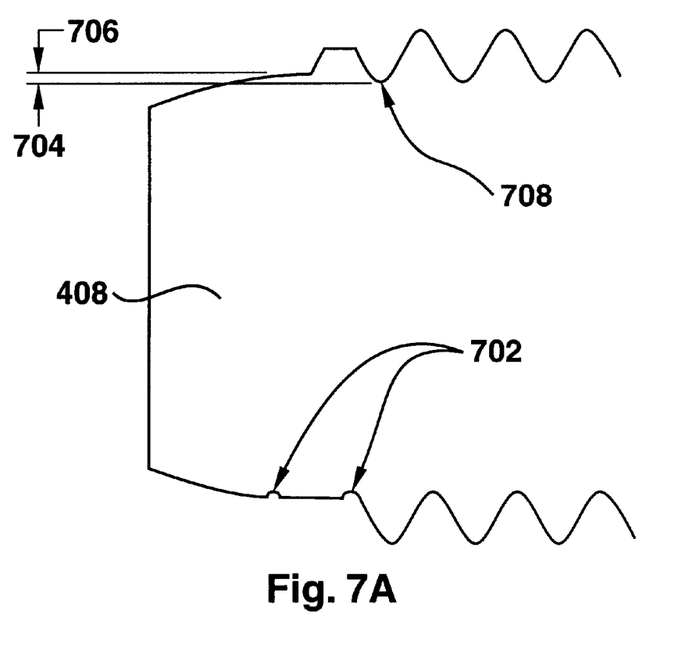
FIGS. 7A and 7B are side elevational views of portions of the fasteners illustrated in FIGS. 4A and 4B, respectively.

The maximum diameter of the lead-in taken on a plane perpendicular to the axis of the externally threaded fastener member is preferably larger than the minor diameter of the external thread, and smaller than the minor diameter of the internal thread. The transition to the normal external thread minor diameter, preferably, is on the opposite side of the lead thread from the lead-in (FIG. 7A). However, it is contemplated and within the scope of the present invention that thread die traces comprising minor diameter thread impressions (caused by thread dies) are on the lead-in surface proximate to the first external thread pitch, or the lead-in cylinder diameter may be equal to the minor diameter of the external thread (smaller diameter than the minor diameter of the mating internal thread).

A novel feature of the present invention is a point having a shape in which the radius or curve on the camming surface of the point varies in every axial section. This radius may change continually in either its size and/or location of its locus, such as to continually present a reduced height surface to the internal thread as the external thread is rotated and thus traverses axially into the internal thread. Transverse sections through the curved portion of the point would exhibit a continually changing radius or locus, with a step present at some location on the point, see generally FIGS. 7C and 7D.

The present invention works especially well with anti-cross threading fasteners more fully disclosed in commonly owned U.S. Pat. No. 5,730,566, issued Mar. 24, 1998; U.S. Pat. No. 5,791,849, issued Aug. 11, 1998; and U.S. patent application Ser. No. 09/006,078, now U.S. Pat. No. 5,836,731; all being incorporated by reference herein.

In an embodiment of the present invention, the rounded lead-in pilot point is at one end of a first member shank proximate to the start of the first external thread pitch. The first member shank comprises a substantially round first member such as, for example, a bolt or screw, having an external helically wound thread on the shank of the first member. At the other end of the first member shank is a head adapted to be engaged by a means for applying rotational torque. The head may be slotted to receive a flat, Phillips, Torx head and the like screwdriver blade, or may have a plurality of flat surfaces parallel with the longitudinal axis of the first member shank for receiving a wrench, socket or other means for rotationally engaging the head.

In another embodiment of the invention, the thread helix has a transitionally curved surface from the minor diameter to the major diameter of a portion of at least one thread of the thread helix. A thread comprises a 360 degree rotation of the thread helix. Proximate to the lead-in of the present invention, the transitionally curved surface may extend over a portion of the first thread, all of the first thread, the first thread and a portion of the second adjacent thread, at least two of the threads or portions thereof, etc. The portion of the external thread helix having the transitionally curved surface is adapted to cam over mating internal threads of a second member when in a cross-threading position, thereby collinearly aligning the first and second members together.

Other and further objects, features and advantages will be apparent from the following description from the presently preferred embodiments of the invention, given for the purpose of disclosure and taken in conjunction with the accompanying drawings.

BRIEF DESCRIPTION OF THE DRAWINGS

FIG. 4D is a cross-sectional view of another embodiment of the pilot point curve forming the pilot point lead-in;

FIG. 4E is a cross-sectional view of yet another embodiment of the pilot point curve forming the pilot point lead-in;

FIG. 4F is a cross-sectional view of still another embodiment of the pilot point curve forming the pilot point lead-in;

FIG. 4G is a cross-sectional view of another embodiment of the pilot point curve forming the pilot point lead-in;

DETAILED DESCRIPTION OF THE PREFERRED EMBODIMENTS

The present invention is an anti-cross threading fastener having a self alignment feature that is new, novel and non-obvious over the related technology. A lead-in pilot point having a variable diameter and a short length, preferably three threads or less, is utilized to prevent cross threading of an externally threaded fastener member with an internally treaded mating fastener member when inserted therein. Longer lengths of the lead-in pilot point are also contemplated and within the scope of the claimed invention. The variable diameter shape of the lead-in of the present invention restricts the first external pitch thread from climbing over the next internal thread peak after engaging the first internal thread.

Referring now to the drawings, the details of the preferred embodiments of the invention are schematically illustrated. Like elements are numbered the same, and similar elements are represented by the same number and a different lower case letter suffix.

Referring now to FIG. 1, a side elevational view of a fastener having an external thread helix and a prior art lead-in pilot point is illustrated. A lead-in pilot point 102 is at one end of the external thread helix fastener represented generally by the numeral 100. The fastener may be, for example, a bolt, screw, and the like. FIG. 2 illustrates a side elevational view of the prior art fastener of FIG. 1 in a position to be jammed into the internal thread helix 202 of a mating internal thread fastener 200.

Figure 3:
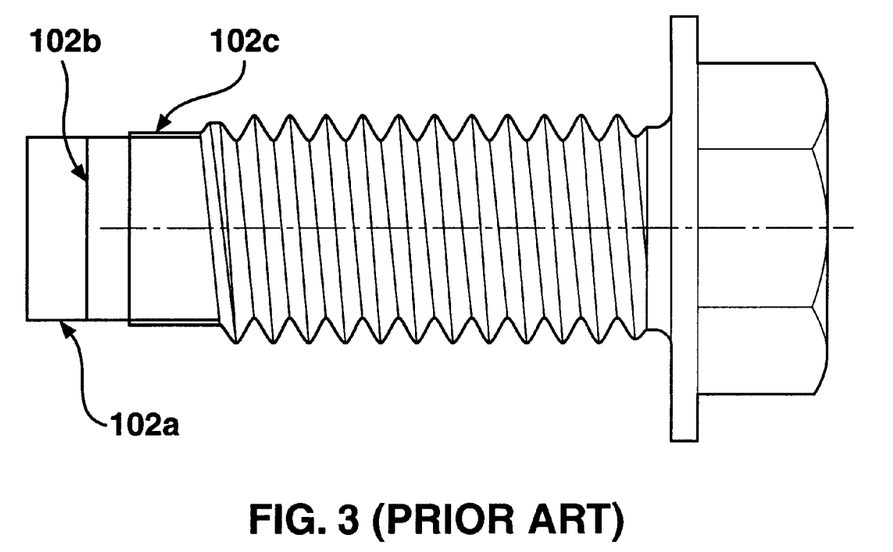
FIG. 3 is a side elevational view of the prior art fastener of FIG. 1 illustrating various typical lengths and diameters of the prior art lead-in pilot point.

Referring now to FIG. 3, a side elevational view of the prior art fastener of FIG. 1 illustrating various typical lengths and diameters of the prior art lead-in pilot point 102. Point 102a is long, i.e., greater than three threads. Point 102b is shorter in length than the point 102a. Point 102c has a greater diameter than either of points 102a, 102b. The shorter point 102b or 102c, may occasionally contribute to thread jamming by becoming lodged in an internal thread 202 of the mating internal thread fastener 200 (see, FIG. 2). This prevents the internal and external thread helixes to feed axially relative to one another, thus preventing the surfaces of the internal and external fastener member portions from sliding into correct axial alignment. When this occurs, continuing to turn the fastener member(s) will result in one or both of the fastener member thread helixes being damaged. The purpose of the lead-in 102 is to reduce axial mis-alignment. Therefore, when a shorter lead-in point 102c is used, the diameter of the lead-in 102c generally needs to be made larger so as to properly restrict axial misalignment. A larger lead-in diameter, however, makes it more difficult to feed the lead-in 102c into the internal thread 202, and thus the less effective is the desired axial alignment therebetween.

Referring now to FIGS. 4A and 4B, side elevational views of embodiments of fasteners, according to the present invention, are illustrated. An externally threaded fastener, illustrated as a bolt, having a standard thread helix is illustrated and generally designated by the reference numeral 400a. A threaded fastener having an anti-cross threading portion of a thread helix is illustrated and generally designated by the reference numeral 400b. Anti-cross threading fasteners are more fully disclosed in commonly owned U.S. Pat. No. 5,730,566, issued Mar. 24, 1998; U.S. Pat. No. 5,791,849, issued Aug. 11, 1998; and U.S. patent application Ser. No. 09/006,078, now U.S. Pat. No. 5,836,731; all being incorporated by reference herein. The fastener 400 comprises a head 402 having a plurality of flat faces 404, a threaded shank 406, and a rounded lead-in pilot point 408, according to the present invention.

The head 402 is adapted for engagement by a tool (not illustrated) for applying rotational torque to the fastener 400. The plurality of faces 404 on the head 402 provide flat surfaces adapted to receive and provide a non-slip surface for the tool such as a wrench, socket, pliers and the like. The head 402 may also be slotted to receive a screwdriver blade (flat, Phillips, Torx, etc.). It is contemplated herein and within the scope of the claimed invention to encompass all adaptations for imparting rotational torque to the fastener 400. In addition, the invention may be utilized with any type of threaded fastener such as, for example, a bolt, screw, stud, rod or other substantially round member having a uniform, non-uniform or tapered external helical thread that can be screwably engaged into a mating member such as a nut, bolt or hole having a substantially matching internal helical thread (not illustrated).

Figure 4C:
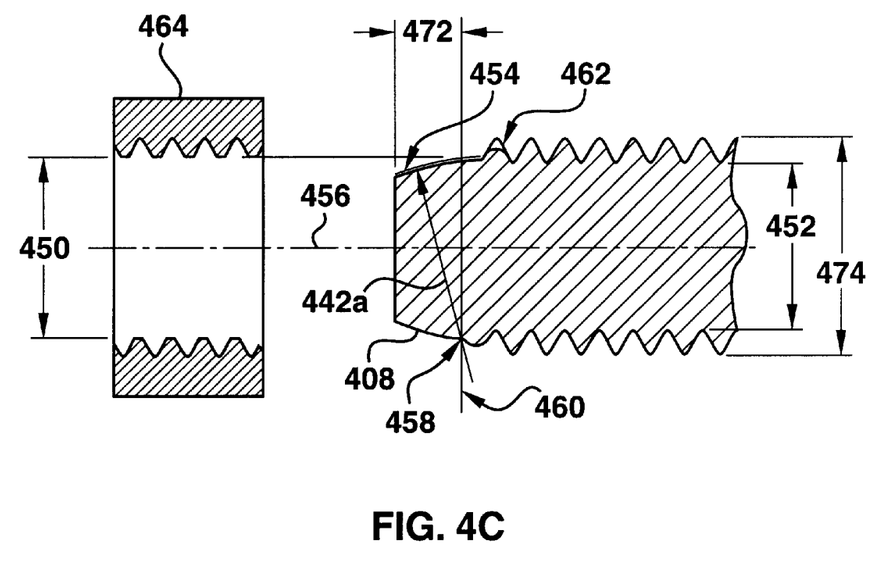
FIG. 4C is a cross-sectional view of the fastener of FIG. 4A taken along cross section B—B and a cross-sectional view of a mating nut.
Figure 5:
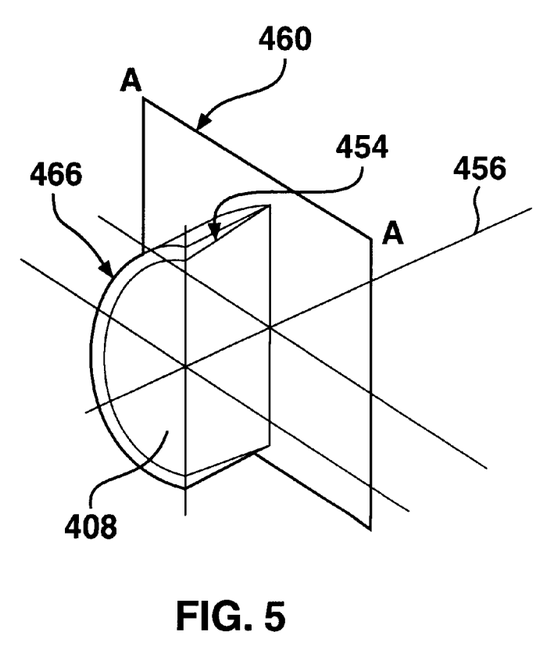
FIG. 5 is an orthogonal view of a portion of the fastener of FIG. 4A taken along cross section A—A.

Referring to FIG. 4C, a cross-sectional view of the fastener of FIG. 4A, taken along cross section B—B, and a cross-sectional view of a mating nut is illustrated. Referring to FIG. 5, an orthogonal view of a portion of the fastener of FIG. 4A taken along cross section A—A is illustrated. According to the present invention, the shape of the surface of the lead-in point 408 in any axial section is defined by a curve 454 tangent to the inside of a cylinder 466 formed about the thread axis 456. The maximum diameter of the cylinder 466 is smaller than the smallest permissible minor (inner) diameter of the mating internal thread of an internally threaded member 464, represented by dimension 450, and preferably larger than the minor diameter of the external threads, represented by dimension 452. The curve 454, representing the rounded nose of the lead-in point 408, is preferably of a radius equal to the diameter of the cylinder 466, and has its locus 458 on the opposite side thereof. It is contemplated and within the scope of the present invention that the curve 454 of the lead-in point 408 may be comprised of any convex curve, or series of curves and straight sections, provided that the curve 454 does not exceed the limits of an area defined by the smallest and largest permissible radii (diameters 452 and 450, respectively) described hereinabove. The locus 458 of the radius 442a (see FIG. 4A) forming the curve 454 and the tangent point of the curve 454 to the cylinder 466 lie on the opposite sides of the cylinder 466 at the intersection of a plane 460 normal to the axis 456 of the fastener 400 and the cylinder 466. The plane 460 is preferably located proximate to the lead thread at the base of the leading thread surface (flank or curve) represented by the numeral 462, where it intersects the cylinder 466, in the first location on the thread helix where the overall thread height reaches approximately the height of the pitch diameter in an axial section thereof.

Figure 6A:
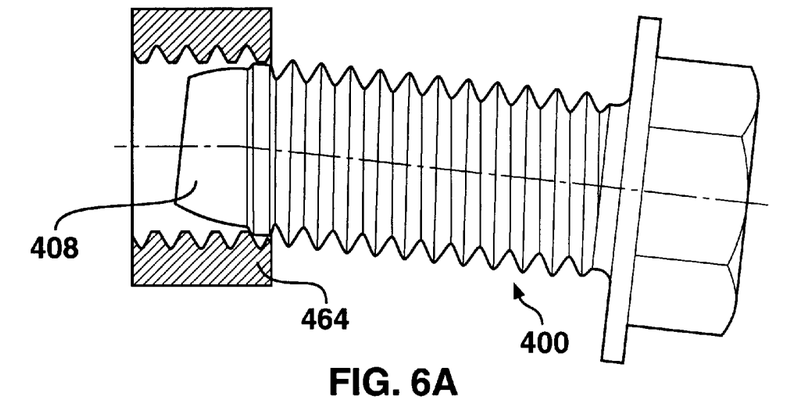
FIGS. 6A–6C are side elevational and cut section views illustrating various angles of misalignment of the fastener according to the present invention.
Figure 6B:
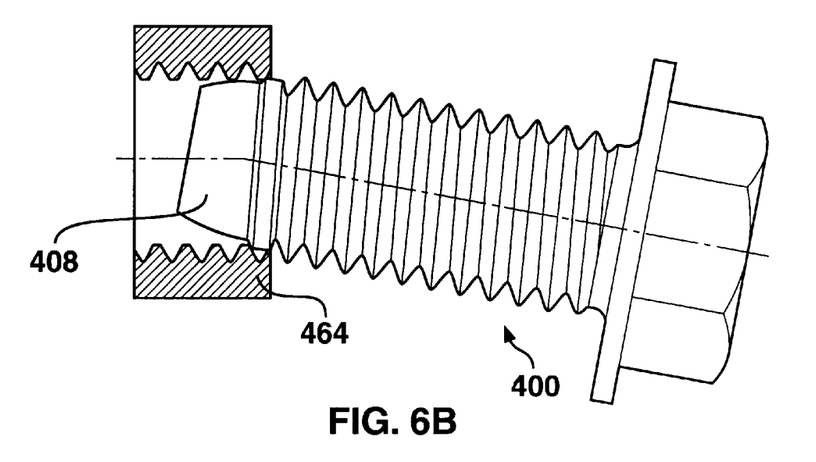
Figure 6C:
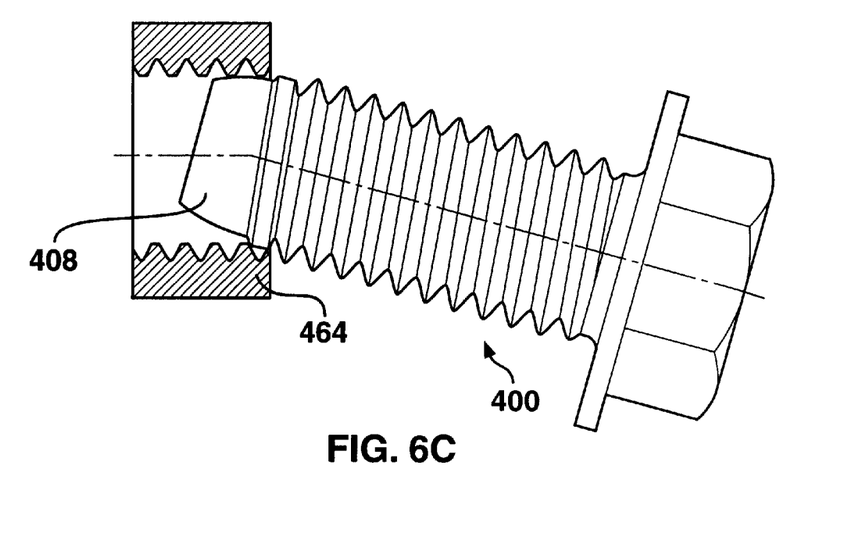

Referring to FIGS. 6A–6C, side elevational and cut section views illustrating various angles of misalignment of the fastener 400 are illustrated. FIG. 6A represents an axial displacement of approximately 5 degrees, FIG. 6B represents an axial displacement of approximately 10 degrees and FIG. 6C represents an axial displacement of approximately 15 degrees. Every point on the curve 454 forming the lead-in point 408 may be at a constant distance from the locus 458. This distance is such that when the first external thread pitch 462 has engaged the first full height thread pitch of the internal thread, the externally threaded fastener 400 may freely pivot about the intersection of the lead-in point 408 and the first thread of the internally threaded member 464 without contacting an adjacent internal thread. The constant distance also insures that the first external thread pitch 462 (be it a full or partial thread or a special thread from a localized height preferably at least 40% of a full thread height) is restricted from climbing over the next internal thread peak of the internally threaded member 464, i.e., the lead-in curve 454 restricts the radial movement of the first external thread 462 when engaging the first internal thread of the internally threaded member 464.

Figure 4D:
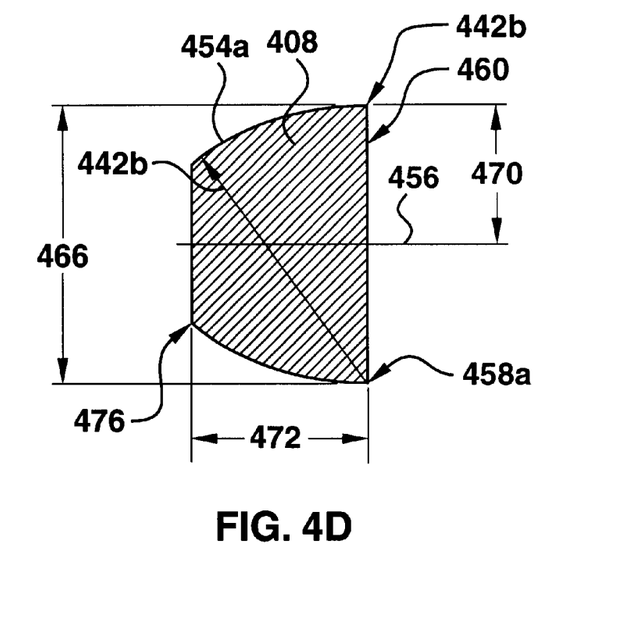

Referring now to FIG. 4D, a schematic cross sectional view of another embodiment of the pilot point curve forming the pilot point lead-in is illustrated. The lead-in pilot point 408 has a curve 454a defined by a radius 442b which is larger than the pilot cylinder radius 470, but smaller than the external thread major diameter represented by dimension 474 (FIG. 4C). The radius 442b of the pilot point curve 454a is tangent to the pilot cylinder 466 at the intersection of the plane 460 perpendicular with the axis 456 of the cylinder 466. The locus 458a of the pilot point curve radius 442b may be located on the plane 460 and between the thread axis 456 and the thread major diameter 474. A small radius at edge 476 may be desirable but is not required for operation of the invention.

Figure 4E:
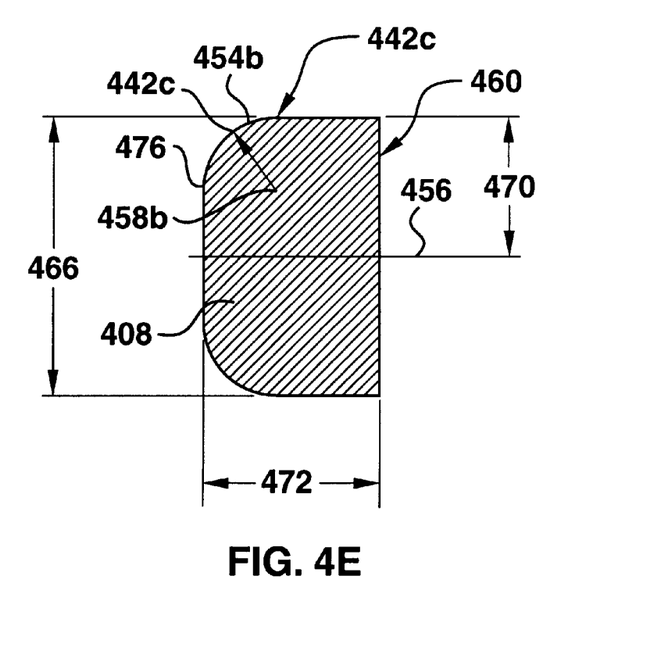

Referring now to FIG. 4E, a schematic cross sectional view of another embodiment of the pilot point curve forming the pilot point lead-in is illustrated. The lead-in pilot point 408 has a curve 454b defined by a radius 442c which is smaller than the pilot cylinder radius 470, but larger than one half the thread pitch. The radius 442c of the pilot point curve 454b is tangent to or intersects the pilot cylinder 466, and is tangent to the end of the pilot point (at the edge 476). A small radius at the edge 476 may be desirable but is not required for operation of the invention.

Figure 4F:
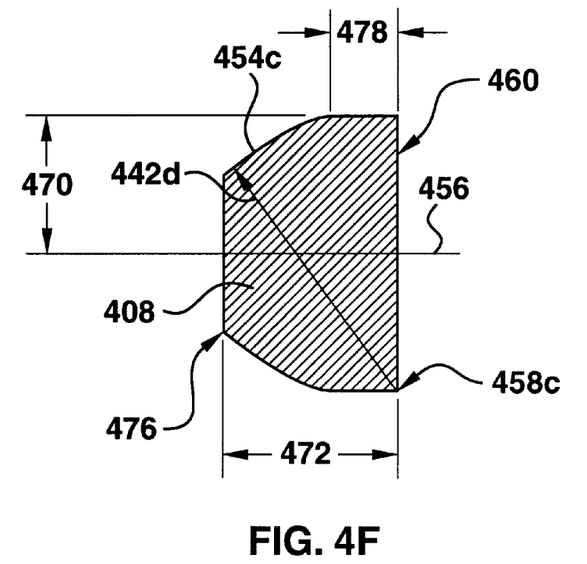

Referring now to FIG. 4F, a schematic cross sectional view of another embodiment of the pilot point curve forming the pilot point lead-in is illustrated. The lead-in pilot point 408 has a curve 454c defined by a radius 442d which is smaller than the external thread major diameter 474 (FIG. 4C) but larger than the pilot radius 470. The radius 442c of the pilot point curve 454c is not tangent to but intersects the pilot cylinder 466 within two thread pitches, represented by dimension 478, of a plane 460 intersecting the proximate end of the pilot point adjacent the start of the first thread (at plane 460). The locus 458c of the radius 442d may be within plus or minus one thread pitch (axially) of the plane 460 at the proximate end of the pilot point (closest to the start of the first thread). The locus 458c preferably may be located between the axis 456 of the pilot cylinder 466 and the external thread major diameter 474. A small radius at edge 476 may be desirable but is not required for operation of the invention.

Figure 4G:
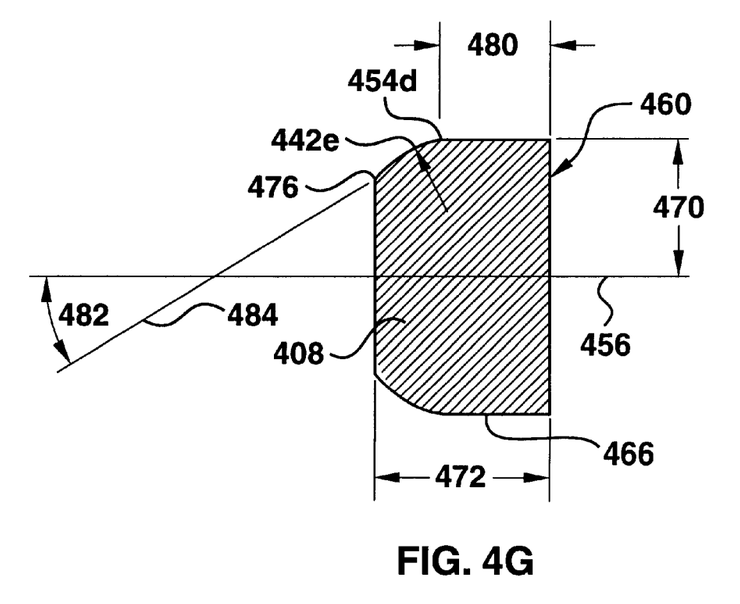

Referring now to FIG. 4G, a schematic cross sectional view of another embodiment of the pilot point curve forming the pilot point lead-in is illustrated. The lead-in pilot point 408 has a curve 454d defined by a radius 442e which is smaller than the pilot radius 470 but larger than one half the thread pitch. The radius 442e of the pilot point curve 454d intersects, or alternatively, is tangent to the pilot cylinder 466. The pilot point curve radius 442e may be tangent to a line 484 at the end of the distal end of the pilot point lead-in and at an angle of from about 14 to 60 degrees, represented by angle 482, of the pilot point axis 456. A small radius at edge 476 may be desirable but is not required for operation of the invention.

Referring to FIG. 4C–4G, the length of the lead-in point 408 is preferably from one to three thread pitches, represented by dimension 472. The curved surface of the lead-in point 408 is such that at any practical angle of insertion (where thread engagement is possible), the dimensional characteristics of the lead-in point 408 present only a curved surface (454) (not an edge) for possible contact with the internal threads of the internally threaded member 464. The length of the lead-in point 408 also insures that the end of the fastener member (bolt 400) is small enough to feed into internal threads of a mating internally threaded member 464 (see FIGS. 4C, 6A, 6B and 6C) at all angles where such thread contact is effective in producing a threaded joint.

Figure 7B:
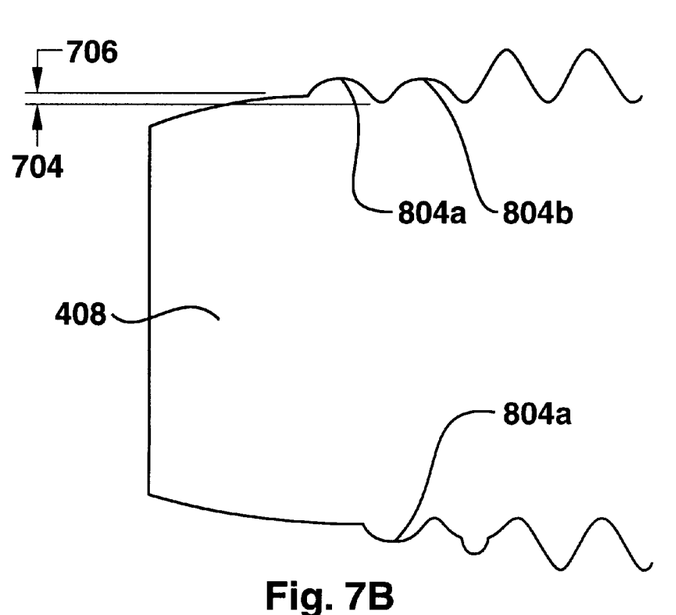

Referring now to FIGS. 7A and 7B, illustrated are side elevational views of portions of the fasteners illustrated in FIGS. 4A and 4B, respectively. The maximum diameter 706 of the lead-in point 408 taken on a plane perpendicular to the axis of the externally threaded fastener member 408 is preferably larger than the minor diameter 704 of the external thread, and smaller than the minor diameter of the internal thread (diameters 452 and 450, respectively of FIG. 4C). The transition to the normal external thread minor diameter, preferably, is on the opposite side of the lead thread, indicated by numeral 708. However, it is contemplated and within the scope of the present invention that thread die traces 702 comprising minor diameter thread impressions (caused by thread dies) may be on the surface of the lead-in point 408 proximate to the first external thread pitch, or the lead-in point 408 cylinder diameter may be equal to the minor diameter of the external thread (smaller diameter than the minor diameter of the mating internal thread).

The helical thread illustrated in FIG. 7A may be of any standard thread type known or obvious to one of ordinary skill in the art of screwable fasteners. The helical thread illustrated in FIG. 7B is an anti-cross threading fastener having a transitionally curved surface from the minor diameter to the major diameter of a portion of at least one thread of the thread helix. A thread comprises a 360 degree rotation of the thread helix. Proximate to the lead-in point 408 of the present invention, the transitionally curved surface may extend over a portion of the first thread, all of the first thread, the first thread and a portion of the second adjacent thread, at least two of the threads or portions thereof, etc. The portion of the external thread helix having the transitionally curved surface is adapted to cam over mating internal threads of a second member when in a cross-threading position, thereby collinearly aligning the first and second members together. This anti-cross threading fastener is more fully described hereinbelow.

Figure 7C:
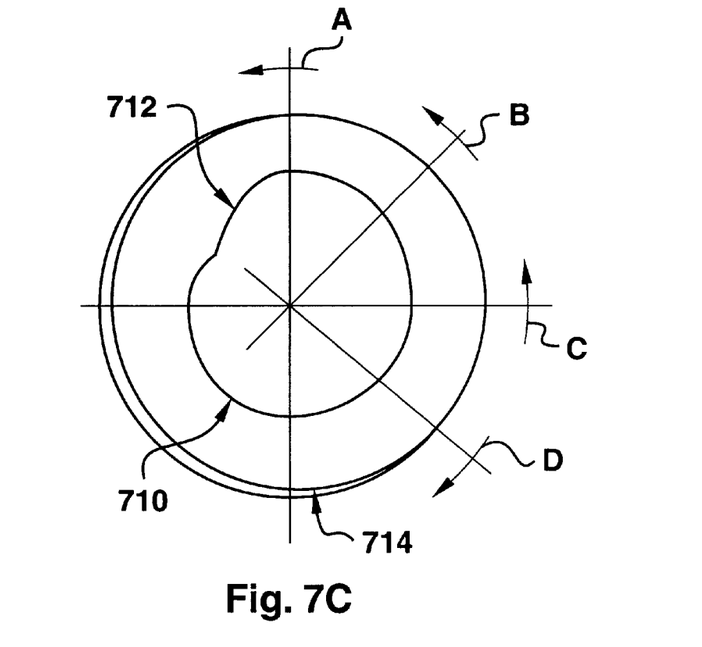
FIGS. 7C and 7D are a schematic end view and a section view, respectively, of an embodiment of the pilot point.
Figure 7D:
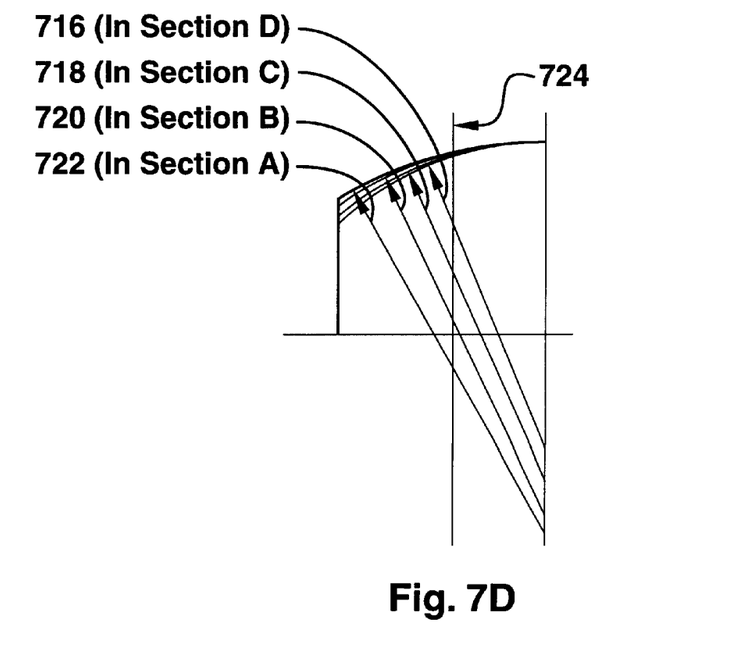

Referring to FIGS. 7C and 7D, a schematic end view and a schematic section view, respectively, of an embodiment of the pilot point are illustrated. FIG. 7C illustrates an view of the pilot point having a shape in which the radius or curve on the camming surface of the point varies in every axial section. Section 714 of FIG. 7C is taken along plane 724 of FIG. 7D. This radius may change continually in either its size and/or location of its locus, such as to continually present a reduced height surface to the internal thread as the external thread is rotated and thereby traverses axially into the internal thread. Transverse sections through the curved portion of the point would exhibit a continually changing radius or locus, with a step 712 present at some location on the point. The end of the point is generally indicated by the numeral 710. Radii of sections A, B, C and D in FIG. 7C are illustrated by the numerals 722, 720, 718 and 716, respectively, in FIG. 7D.

Figure 8:
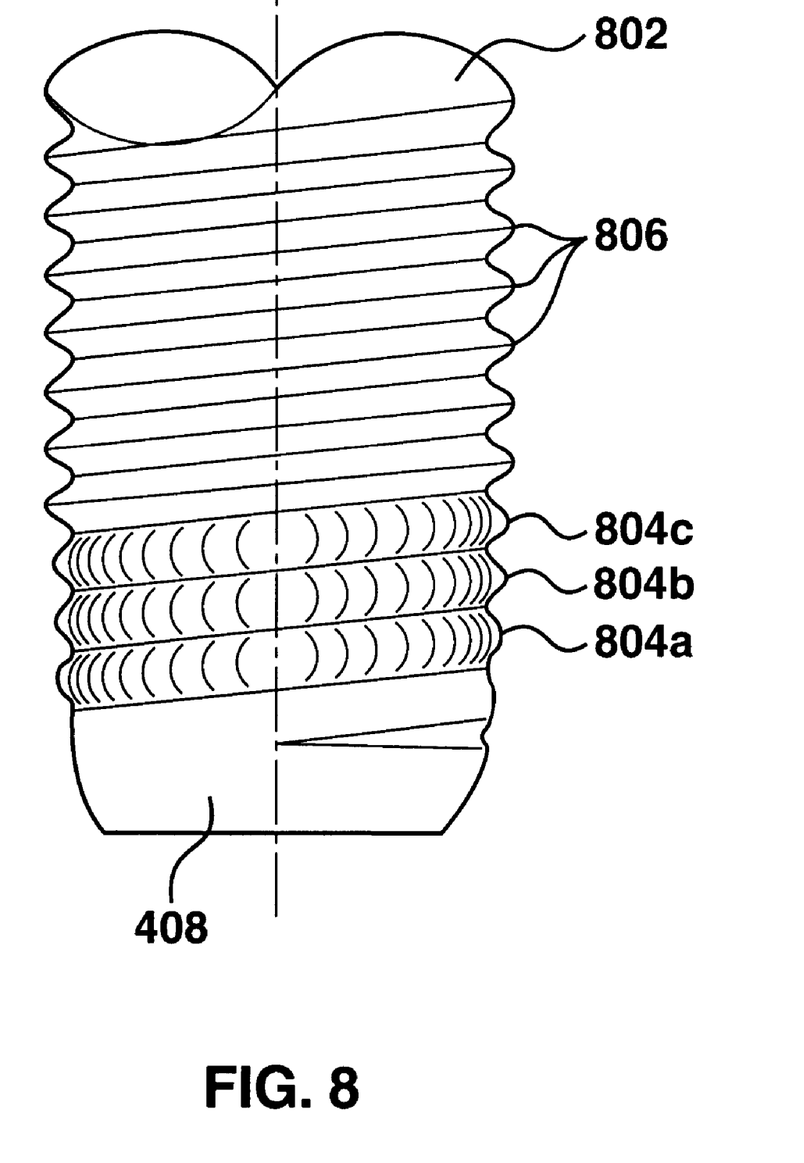
FIG. 8 is a side elevational view of a portion of the fastener illustrated in FIG. 4B.

Referring now to FIG. 8, a schematic elevational partial view of a threaded shank 802 of FIGS. 4B is illustrated. The shank 802 has threads such as standard machine threads and a transitional thread(s) 804 toward the end of the shank 802 opposite the head 402 (FIG. 4B). Three transitional threads 804a, 804b and 804c are illustrated. Only a portion of one transitional thread 804a is necessary for operation of the anti-cross threading fastener, however, two or more threads (804a, 804b, 804c) may also be used with equally good results.

The threads 804a, 804b and 804c have the same minor thread diameter as the other threads 806, but differ in that a transitional surface is blended into the flanks of the threads 804a, 804b and 804c. The transitional surface of the threads 804a, 804b and 804c may be curved, round, parabolic or any other transitional shape that may be easily rolled when forming the threads 806, 804a, 804b and 804c on the shank 802. The outside diameter of the primary transition threads 804a, 804b and 804c preferably do not exceed the pitch diameter and may start anywhere from the first transition thread 804a inward (804b and 804c). The outer diameter of the transition threads 804a, 804b and 804c are such as to allow them to easily cam over the first few inside threads of the internally threaded member 464 (see FIGS. 6A, 6B and 6C). Once the transition thread(s) 804 cams over during misalignment, the remaining external threads 806 are in substantially correct axial alignment with the mating internal threads of the internally threaded member 464 so that cross-threading does not occur.

Figure 9A:
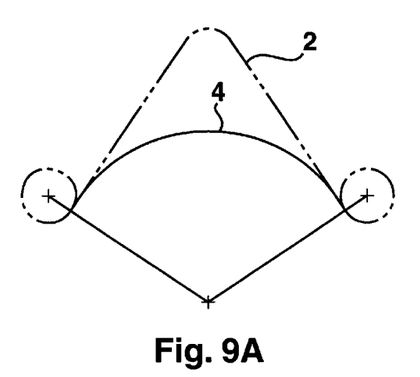
FIGS. 9A–9D illustrate various embodiments of the transitional curved surface used in conjunction with the present invention.
Figure 9B:
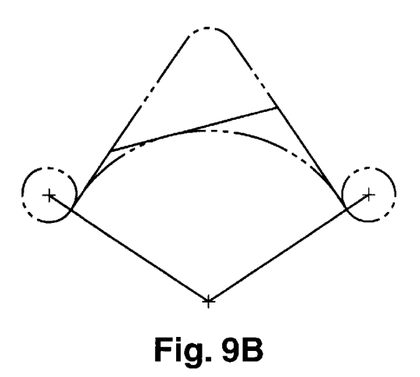
Figure 9C:
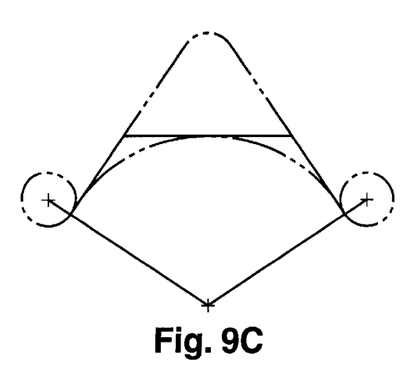
Figure 9D:
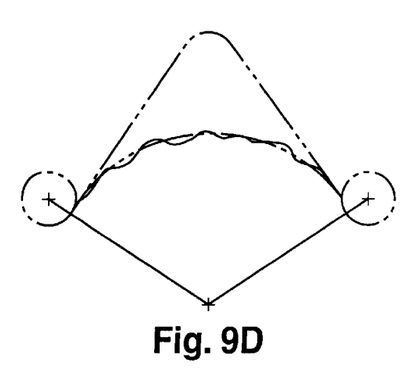

Referring now to FIGS. 9A–9D, various embodiments of the transitional surfaces of the present invention are illustrated. A typical machine thread is illustrated by the dashed line 902 and the transitional curved thread is illustrated by the solid line 904. The lead threads (external or internal), as disclosed above, have transitional curved surfaces. These transitional curved surfaces may be preferably implemented as follows: FIG. 9A illustrates a smoothly curving profile for the transitional surface. FIG. 9B illustrates an angled crest flat for the transitional surface. FIG. 9C illustrates a flat truncated crest for the transitional surface. FIG. 9D illustrates a series of flats/curved surfaces approximating the transitional curved surface of FIG. 9A. Many other embodiments of the transitional curved surface may be implemented and are contemplated herein The present invention, therefore, is well adapted to carry out the objects and attain the ends and advantages mentioned, as well as others inherent therein. While a presently preferred embodiment of the invention has been given for purposes of disclosure, numerous changes in the details of procedures for accomplishing the desired results will readily suggest themselves to those skilled in the art, and which are encompassed within the spirit of the invention and the scope of the appended claims.

What is claimed is:

1. A threaded fastener having an anti-cross threading lead-in point, said fastener comprising:

a substantially round shank member having first and second ends and a continuous helix comprised of a plurality of threads around a circumference of said shank member, the plurality of threads having a first minor and a first major diameter, wherein the plurality of threads are adapted to mate with corresponding threads of a receiving member, the corresponding threads of a receiving member, the corresponding threads having a second minor and a second major diameter; and a lead-in point at the first end of said shank member, said lead-in point comprising a variable outer diameter and a length, wherein the variable outer diameter is maximum proximate to the first end of said shank member and becomes smaller toward an end of said lead-in point distal from the first end of said shank member, wherein the shape of said lead-in point is defined by a curve tangent to the inside of a cylinder formed about an axis of the plurality of threads, wherein the diameter of the cylinder is smaller than the second minor diameter and larger than the first minor diameter, the curve having a radius equal to the diameter of the cylinder and the radius locus is located on a plane proximate to the first end of said shank member and the diameter of the cylinder.

2. The fastener of claim 1, wherein the shape of said lead-in point is defined by a curve tangent to the inside of a cylinder formed about an axis of the plurality of threads, wherein the diameter of the cylinder is smaller than the second minor diameter and larger than the first minor diameter, the curve having a radius of from one half to one diameter of the cylinder and the radius locus is located on a plane proximate to the first end of said shank member and between the diameter of the cylinder and the axis of the plurality of threads.

3. The fastener of claim 1, wherein the shape of said lead-in point is defined by a curve tangent to the inside of a cylinder formed about an axis of the plurality of threads, wherein the diameter of the cylinder is smaller than the second minor diameter and larger than the first minor diameter, the curve having a radius greater than one half the cylinder diameter and smaller than the first major diameter, the radius locus is located on a plane proximate to the first end of said shank member and between the diameter of the cylinder and the axis of the plurality of threads.

4. The fastener of claim 1, wherein the shape of said lead-in point is defined by a curve tangent to the inside of a cylinder formed about an axis of the plurality of threads, wherein the diameter of the cylinder is smaller than the second minor diameter and larger than the first minor diameter, the curve having a radius smaller than one half the cylinder diameter and larger than one half of a thread pitch.

5. The fastener of claim 1, wherein the shape of said lead-in point is defined by a curve which intersects a cylinder formed about an axis of the plurality of threads, wherein the diameter of the cylinder is smaller than the second minor diameter and larger than the first minor diameter, the curve having a radius smaller than the first major diameter and larger than one half the cylinder diameter, the radius locus is located within plus or minus one thread pitch axially of a plane proximate to the first end of said shank member and between the diameter of the cylinder and the axis of the plurality of threads.

6. The fastener of claim 1, wherein the shape of said lead-in point is defined by a curve on a cylinder formed about an axis of the plurality of threads, wherein the diameter of the cylinder is smaller than the second minor diameter and larger than the first minor diameter, the curve having a radius smaller than one half the cylinder diameter and larger than one half of a thread pitch.

7. The fastener of claim 6, wherein the curve is tangent to the cylinder.

8. The fastener of claim 6, wherein the curve intersects the cylinder and is tangent to a line forming an angle of between 14 and 60 degrees with the axis of the plurality of threads.

9. An anti-cross threading fastener and lead-in point, comprising:
- a substantially round shank member having first and second ends and a continuous helix comprised of a plurality of threads around a circumference of said shank member, the plurality of threads having a first minor diameter, wherein the plurality of threads are adapted to mate with corresponding threads of a receiving member, the corresponding threads having a second minor and a second major diameter; and
- at least one thread of the plurality of threads proximate the first end of said shank member, the at least one thread having an third diameter and a surface;
- the remaining plurality of threads having a first major diameter; and
- the third diameter of the at least one thread is smaller than the major diameter of the remaining plurality of threads, and the surface of the at least one thread is a transitional surface from the minor diameter to the outside diameter so that the portion of at least one thread of the plurality of threads is adapted to cam over corresponding mating threads of a receiving member until there is substantially collinear alignment therebetween; and
- a lead-in point at the first end of said shank member, said lead-in point comprising a variable outer diameter and a length, wherein the variable outer diameter is maximum proximate to the first end of said shank member and becomes smaller toward an end of said lead-in point distal from the first end of said shank member;
- wherein the maximum outer diameter of said lead-in point is larger then the first minor diameter and smaller then the second minor diameter.

10. The anti-cross threading fastener and lead-in point of claim 9, wherein the shape of said lead-in point is defined by a curve tangent to the inside of a cylinder formed about an axis of the plurality of threads, wherein the diameter of the cylinder is smaller than the second minor diameter and larger than the first minor diameter, the curve having a radius equal to the diameter of the cylinder and the radius locus is located on a plane proximate to the first end of said shank member and the diameter of the cylinder.

11. The anti-cross threading fastener and lead-in point of claim 9, wherein the shape of said lead-in point is defined by a curve tangent to the inside of a cylinder formed about an axis of the plurality of threads, wherein the diameter of the cylinder is smaller than the second minor diameter and larger than the first minor diameter, the curve having a radius of from one half to one diameter of the cylinder and the radius locus is located on a plane proximate to the first end of said shank member and between the diameter of the cylinder and the axis of the plurality of threads.

12. The anti-cross threading fastener and lead-in point of claim 9, wherein the shape of said lead-in point is defined by a curve tangent to the inside of a cylinder formed about an axis of the plurality of threads, wherein the diameter of the cylinder is smaller than the second minor diameter and larger than the first minor diameter, the curve having a radius greater than one half the cylinder diameter and smaller than the first major diameter, the radius locus is located on a plane proximate to the first end of said shank member and between the diameter of the cylinder and the axis of the plurality of threads.

13. The anti-cross threading fastener and lead-in point of claim 9, wherein the shape of said lead-in point is defined by a curve tangent to the inside of a cylinder formed about an axis of the plurality of threads, wherein the diameter of the cylinder is smaller than the second minor diameter and larger than the first minor diameter, the curve having a radius smaller than one half the cylinder diameter and larger than one half of a thread pitch.

14. The anti-cross threading fastener and lead-in point of claim 9, wherein the shape of said lead-in point is defined by a curve which intersects a cylinder formed about an axis of the plurality of threads, wherein the diameter of the cylinder is smaller than the second minor diameter and larger than the first minor diameter, the curve having a radius smaller than the first major diameter and larger than one half the cylinder diameter, the radius locus is located within plus or minus one thread pitch axially of a plane proximate to the first end of said shank member and between the diameter of the cylinder and the axis of the plurality of threads.

15. The anti-cross threading fastener and lead-in point of claim 9, wherein the shape of said lead-in point is defined by a curve on a cylinder formed about an axis of the plurality of threads, wherein the diameter of the cylinder is smaller than the second minor diameter and larger than the first minor diameter, the curve having a radius smaller than one half the cylinder diameter and larger than one half of a thread pitch.

16. The fastener of claim 15, wherein the curve is tangent to the cylinder.

17. The fastener of claim 15, wherein the curve intersects the cylinder and is tangent to a line forming an angle of between 14 and 60 degrees with the axis of the plurality of threads.

18. An anti-cross threading fastener, comprising:
- a substantially round shank member having first and second ends a nd a continuous helix comprised of a plurality of threads around a circumference of said shank member, the plurality of threads having a constant minor diameter and the plurality of threads being adapted to mate with corresponding threads of a receiving member;
- a portion of at least one thread of the plurality of threads proximate the first end of said shank member, said portion of at least one thread having an outside diameter and a surface;
- the remaining plurality of threads having a major diameter; and
- the outside diameter of the portion of at least one thread is smaller than the major diameter of the remaining plurality of threads, and the surface of the portion of at least one thread is a transitional surface from the minor diameter to the outside diameter so that the portion of at least one thread of the plurality of threads is adapted to cam over corresponding mating threads of a receiving member until there is substantially collinear alignment therebetween;

wherein the transitional surface of the portion of at least one thread is a curved shape approximated by a plurality of flat and curved surfaces.

19. The anti-cross threading fastener of claim 18, wherein the transitional surface of the portion of at least one thread is an angled crest flat shape.

20. The anti-cross threading fastener of claim 18, wherein the transitional surface of the portion of at least one thread is a flat truncated crest shape.

* * * * *